(12) United States Patent
Vikström et al.

(10) Patent No.: US 12,090,983 B2
(45) Date of Patent: Sep. 17, 2024

(54) METHOD OF CONTROLLING A HEAVY-DUTY VEHICLE IN A SLOPE

(71) Applicant: Volvo Truck Corporation, Gothenburg (SE)

(72) Inventors: Anders Vikström, Gothenburg (SE); Nicolas Soulier, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 319 days.

(21) Appl. No.: 17/689,201

(22) Filed: Mar. 8, 2022

(65) Prior Publication Data
US 2022/0306060 A1   Sep. 29, 2022

(30) Foreign Application Priority Data
Mar. 23, 2021   (EP) ..................................... 21164300

(51) Int. Cl.
*B60T 8/24* (2006.01)
*B60T 8/17* (2006.01)
(Continued)

(52) U.S. Cl.
CPC ............ *B60T 8/245* (2013.01); *B60T 8/1708* (2013.01); *B60T 8/172* (2013.01); *B60W 30/14* (2013.01);
(Continued)

(58) Field of Classification Search
CPC ........ B60T 8/245; B60T 8/1708; B60T 8/172; B60T 2201/06; B60T 2210/12;
(Continued)

(56) References Cited

U.S. PATENT DOCUMENTS

| 8,909,449 B2 | 12/2014 | Eberling et al. | |
| 2002/0117892 A1* | 8/2002 | McCann | F16D 66/00 303/20 |
| 2004/0012249 A1* | 1/2004 | Koelzer | B60T 8/323 303/3 |
| 2006/0186731 A1* | 8/2006 | Bach | B60T 7/104 303/191 |

(Continued)

FOREIGN PATENT DOCUMENTS

| CN | 106394522 A | 2/2017 |
| CN | 112208536 A | 1/2021 |

(Continued)

OTHER PUBLICATIONS

Extended European Search Report for European Patent Application No. 21164300.2, mailed Sep. 15, 2021, 8 pages.

*Primary Examiner* — Aniss Chad
*Assistant Examiner* — Chase L Cooley
(74) *Attorney, Agent, or Firm* — Withrow & Terranova, PLLC

(57) ABSTRACT

The invention relates to a method of controlling a heavy-duty vehicle in a slope when the vehicle has come to a standstill due to service brakes of the vehicle having applied a service brake force, the method comprising determining a total brake force required for maintaining the vehicle at standstill, activating at least one park brake for providing a park brake force, gradually increasing the park brake force, and, while the park brake force is gradually increased, gradually reducing the service brake force while maintaining the sum of the service brake force and the park brake force at least equal to the determined total brake force.

14 Claims, 5 Drawing Sheets

(51) Int. Cl.
  *B60T 8/172* (2006.01)
  *B60W 30/14* (2006.01)
(52) U.S. Cl.
  CPC ....... *B60T 2201/06* (2013.01); *B60T 2210/12* (2013.01); *B60T 2250/02* (2013.01); *B60W 2520/04* (2013.01); *B60W 2530/10* (2013.01); *B60W 2552/15* (2020.02); *B60W 2552/40* (2020.02); *B60W 2710/18* (2013.01)
(58) Field of Classification Search
  CPC ...... B60T 2250/02; B60T 7/122; B60T 8/171; B60T 8/1887; B60T 8/323; B60T 13/662; B60T 13/683; B60T 7/12; B60T 2210/20; B60W 30/14; B60W 2520/04; B60W 2530/10; B60W 2552/15; B60W 2552/40; B60W 2710/18
  See application file for complete search history.

(56) References Cited

U.S. PATENT DOCUMENTS

| | | |
|---|---|---|
| 2006/0267402 A1 | 11/2006 | Leiter et al. |
| 2010/0072021 A1* | 3/2010 | Kingston ................ B60T 1/062 192/218 |
| 2010/0090522 A1 | 4/2010 | Bensch et al. |
| 2010/0211281 A1* | 8/2010 | Baier-Welt ............ B60T 8/1764 701/70 |
| 2014/0144730 A1* | 5/2014 | Schwarz ................ B60T 7/042 188/72.3 |

FOREIGN PATENT DOCUMENTS

| | | |
|---|---|---|
| DE | 10238870 A1 | 3/2004 |
| DE | 102011083171 A1 | 3/2012 |
| WO | 2006125581 A1 | 11/2006 |

* cited by examiner

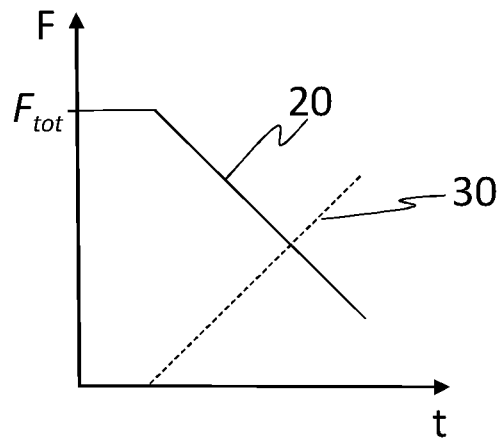
Fig. 3
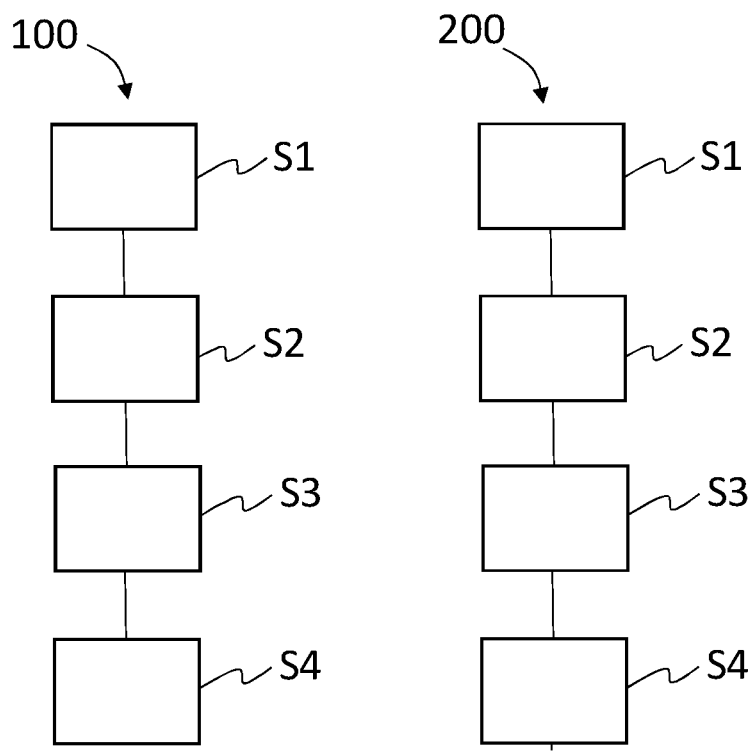
Fig. 4
Fig. 5

METHOD OF CONTROLLING A HEAVY-DUTY VEHICLE IN A SLOPE

RELATED APPLICATIONS

The present application claims priority to European Patent Application No. 21164300.2, filed on Mar. 23, 2021, and entitled "METHOD OF CONTROLLING A HEAVY-DUTY VEHICLE IN A SLOPE," which is incorporated herein by reference in its entirety.

TECHNICAL FIELD

The present disclosure relates to a method of controlling a heavy-duty vehicle in a slope, which vehicle has come to a standstill due to service brakes of the vehicle having applied a service bake force. The present disclosure also relates to a computer program, a computer readable medium, and a control unit configured to perform the steps of the method. The present disclosure further relates to a vehicle comprising such a control unit.

The invention can be applied in heavy-duty vehicles, such as trucks, buses and construction equipment. Although the invention will be mainly focussed on trucks, with or without a towed trailer unit, the invention is not restricted to this particular vehicle, but may also be used in other heavy-duty vehicles as well.

BACKGROUND

Vehicles are known to have so called "hill hold functions", such as hill start aid and automatic release of park brake, which can keep a vehicle at a standstill until driver intention to move is detected.

A problem with such functions, in particular for heavy-duty vehicles, is that there is a risk of over-actuating the brakes (i.e. applying too high brake force), which can damage the brakes. Commercial heavy-duty brakes are especially sensitive to fatigue damage over time. On the other hand it is important to secure that enough brake force is applied so that the vehicle will not unintentionally roll away regardless of the conditions (e.g. steep slope, heavy load, etc.). Thus, it would be desirable to find a balance between providing enough brake force for securing the vehicle, without over-actuating the brakes and reducing the life-time thereof. U.S. Pat. No. 8,909,449 B2 discloses that when an operator has applied the service brake and subsequently initiates the parking brake, then the control system will maintain the pressure of the service brake for a certain time period to make sure that the parking brake has had time to be fully applied. Thus, the security aspect is handled by U.S. Pat. No. 8,909,449 B2, avoid unintended pressure drop due to slow actuation time of the park brake, but there is no teaching of how to achieve the security aspect in combination with avoiding over-actuating and damaging the brakes. There is clearly still room for further development within the relevant technical field.

SUMMARY

An object of the invention is to provide a method which at least partly alleviates the drawbacks of the prior art. The object is achieved by a method.

The present inventive concept is based on the realization that a safe standstill can be achieved without over-actuating and damaging the brakes by ramping down the service brake force in a controlled manner after simultaneously with increasing the park brake force. In particular, the inventors have realized that the service brake force should suitably be gradually decreased at a rate which ensures that the total brake force does not fall below a determined level.

Thus, according to a first aspect of the present inventive concept, there if provided a method of controlling a heavy-duty vehicle in a slope, which vehicle has come to a standstill due to service brakes of the vehicle having applied a service brake force, the method comprising:
  determining a total brake force required for maintaining the vehicle at standstill,
  activating at least one park brake for providing a park brake force,
  gradually increasing the park brake force, and
  while the park brake force is gradually increased, gradually reducing the service brake force while maintaining the sum of the service brake force and the park brake force at least equal to the determined total brake force.

By the provision of a method which allows the service brake force to be reduced (in a gradual manner) without waiting for the park brake force to be fully applied, the risk of fatigue damage is reduced without compromising the safety.

According to at least one exemplary embodiment, the said total brake force is calculated and determined based on one or more of the following parameters:
  slope of the road surface,
  load carried by the vehicle,
  friction between the tyres and the road surface.

This is advantageous since a larger slope gradient requires a higher total brake force. Similarly, even for only a small slope, a large load carried by the vehicle will provide a larger force component urging the vehicle to roll and should thus be counteracted by a higher total brake force. Furthermore, it may be suitable to have a higher safety margin if friction is low (e.g. slippery road). The vehicle may suitably be provide with appropriate sensors for providing input to determine the total brake force. Such input may be provided, for example, to a control unit. The load data may, for instance, be derived be estimated during driving (F=m*a), where the acceleration (a) is derived from vehicle speed sensors or wheel speed sensors and the force (F) is derived from engine torque output. Thus, it possible to estimate the mass (m) during driving. In addition, axle load data from suspension systems may be provided, e.g. bellow pressures, level sensors, etc. Such axle load data may be derived for a towing vehicle, such as a truck, as well as for a towed vehicle, such as a trailer. This may also provide information about the load distribution between the different axles. Slope data may be derived from slope sensors, such as accelerometers, but the slope may also be estimated by the above described sensors and calculations.

According to at least one exemplary embodiment, the method comprises:
  setting a safety margin such that said sum of the service brake force and the park brake force is maintained at least equal to the determined total brake force plus the safety margin.

This reduces the risk of potential errors due to tolerances or incorrect estimations. Thus, the safety is further increase, but due to the gradual decrease of the service brake force already before the park brake force has been fully applied, the risk of damaging the brake components is still low.

According to at least one exemplary embodiment, the vehicle comprises a truck unit which tows a trailer unit, the method comprising:

allocating, between wheel axles of the truck unit and wheel axles of the trailer unit, a force distribution of said total brake force in dependence on the load carried by the respective wheel axles.

By allocating the force distribution based on the load carried by the respective wheel axle, the risk of damaging the brake components is reduced. Since in some vehicles the park brake of the trailer unit cannot be actuated from the truck unit (in such cases the driver applies the park brake manually from the outside with a push-button on the trailer unit), in some exemplary embodiments, the trailer unit may therefore be allocated a higher service brake force than the truck unit. In some exemplary embodiments, the trailer unit may be allocated a higher total brake force than the truck unit.

According to at least one exemplary embodiment, the method comprises:

allocating a force distribution between the service brake force and the park brake force based on a defined service brake force function.

The function may suitably be defined to take into account any latency of the park brake force, i.e. its relatively slow increase. This is advantageous since unnecessary compound damage of the brake hardware components may be avoided. The function is suitably a representation of the service brake pressure relative to time. It should be noted that the function does not have to be linear. For instance, in a graphical representation, where the Y-axis represents the service brake pressure and the X-axis represents time, the curve may in some exemplary embodiments be represented with a knee, i.e. the gradient of the increase/decrease of the service brake force, may change after a certain point in time. Other non-linear (or linear) functions are, however, also conceivable.

According to at least one exemplary embodiment, the method comprises:

releasing the service brake and the park brake upon receipt of a propulsion request.

The propulsion request may be driver-initiated or it may be initiated by an adaptive cruise control (ACC) system of the vehicle.

According to at least one exemplary embodiment, the method comprises, before the step of activating the park brake, taking available vehicle motion sensor data into account to detect movement of the vehicle, and,
when movement is detected, gradually increasing the service brake force to regain standstill.

By implementing such motion detection, it is not necessary to apply an excessive service brake force (which may damage the brake components over time), rather a relative low service brake force may be applied, and if it is detected that it is not high enough (i.e. motion is detected), then the service brake force is simply increased to a suitable level. It should be understood that it is also conceivable, at least in some exemplary embodiments, to have the corresponding functionality after the park brake has been activated. Accordingly, even after the park brake has been activated, if movement is detected, the service brake force may be gradually increased to regain standstill.

Thus, in a general sense, according to at least some exemplary embodiments, the method comprises:

taking available vehicle motion sensor data into account to detect movement of the vehicle, and,
when movement is detected, gradually increasing the service brake force to regain standstill.

The vehicle motion sensor data may be provided by various types of sensors. For instance, the vehicle motion sensor data may be provided by wheel speed sensors. This is advantageous since it shows individual axle speeds (e.g. when parked spring-braked axles might "slide", i.e. remain locked, but any additional axle would roll and wheel speed sensors would detect this). Other means for providing the vehicle motion sensor data may be propulsion shaft sensors, cameras, or navigation systems, such as GPS.

According to at least one exemplary embodiment, the determined total brake force is set to be, or reset to be, at least equal to the service brake force that has been applied to regain standstill in response to the detection of movement.

This is particularly useful if motion is detected before the park brake has been applied, as it will ensure that the total brake force will be high enough, when the service brake force is later gradually decreased.

According to at least one exemplary embodiment, the step of activating the at least one park brake is performed after a configurable time period.

This is advantageous as it may be possible to adapt the time period based on different conditions.

For instance, according to at least one exemplary embodiment, the configurable time period is dependent on one or more of the following parameters:

slope of the road surface,
load carried by the vehicle.

This is advantageous, since the slope of the road surface affects the force exerted on the vehicle in the downwards direction of the slope. Similarly, in a slope, the load carried by the vehicle also affects that force. It also provides an advantageous security mechanism against electrical faults. For instance, in case of an electrical fault, the service brake pressure will be released (if the brake pedal has been released), which is why for longer time periods it is preferable to have the park brake applied. In steep slopes, in particular, it is more difficult for the driver to react in cause of such an electronic fault, which is why the park brake may suitably be applied at an earlier point in time for steeper slopes. These considerations are reflected in at least the following exemplary embodiment.

Thus, according to at least one exemplary embodiment, the method comprises configuring said time period to be:

shorter for a relatively high load and longer for a relatively low load, and/or
shorter for a relatively steep slope and longer for a relatively moderate slope.

According to at least one exemplary embodiment, the steps of the method, including the exemplary embodiments thereof, are performed autonomously as part of an adaptive cruise control mode of the vehicle. It should, however, be noted that in other exemplary embodiments, the steps may be driver-initiated.

For instance, according to at least one exemplary embodiment, said steps are performed in response to a driver-initiated auto-hold command. However, in other exemplary embodiments, the auto-hold function/button may suitably be activated in the normal start-up state of the vehicle, and if the driver for some reason would like to disable it, he/she may do so.

According to at least one exemplary embodiment, the vehicle comprises a truck unit which tows a trailer unit, wherein the service brake force is distributed between the truck unit and the trailer unit, and wherein the park brake force is applied only to the truck unit.

According to a second aspect of the present disclosure, there is provided a computer program comprising program code means for performing the steps of the method of the first aspect, including any embodiment thereof.

According to a third aspect of the present disclosure, there is provided a computer readable medium carrying a computer program comprising program code means for performing the steps of the method of the first aspect, including any embodiment thereof, when said program product is run on a computer.

According to a fourth aspect of the present disclosure, there is provided a control unit for controlling a heavy-duty vehicle in a slope, the control unit being configured to perform the steps of the method according to the first aspect, including any embodiment thereof.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where it includes a programmable device such as the microprocessor, microcontroller or programmable digital signal processor mentioned above, the processor may further include computer executable code that controls operation of the programmable device.

According to a fifth aspect of the present disclosure, there is provided a vehicle, the vehicle comprising:
 a control unit according to the fourth aspect,
 at least a first sensor for measuring the slope of the road surface, and
 at least a second sensor for measuring the load carried by the vehicle, wherein the control unit is configured to receive measurement data from the first and second sensors.

The advantages of the above mentioned second, third, fourth and fifth aspects of the present disclosure largely correspond to the advantages of the method of the first aspect, including any embodiment thereof.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings:

FIG. 3 is a graph illustrating very schematically an example of how brake forces may be applied in accordance with exemplary embodiments of the invention.

FIG. 4 schematically illustrates a method according to an exemplary embodiment of the invention.

FIG. 5 schematically illustrates a method according to other exemplary embodiments of the invention.

DETAILED DESCRIPTION OF EXAMPLE EMBODIMENTS OF THE INVENTION

Figure 1:
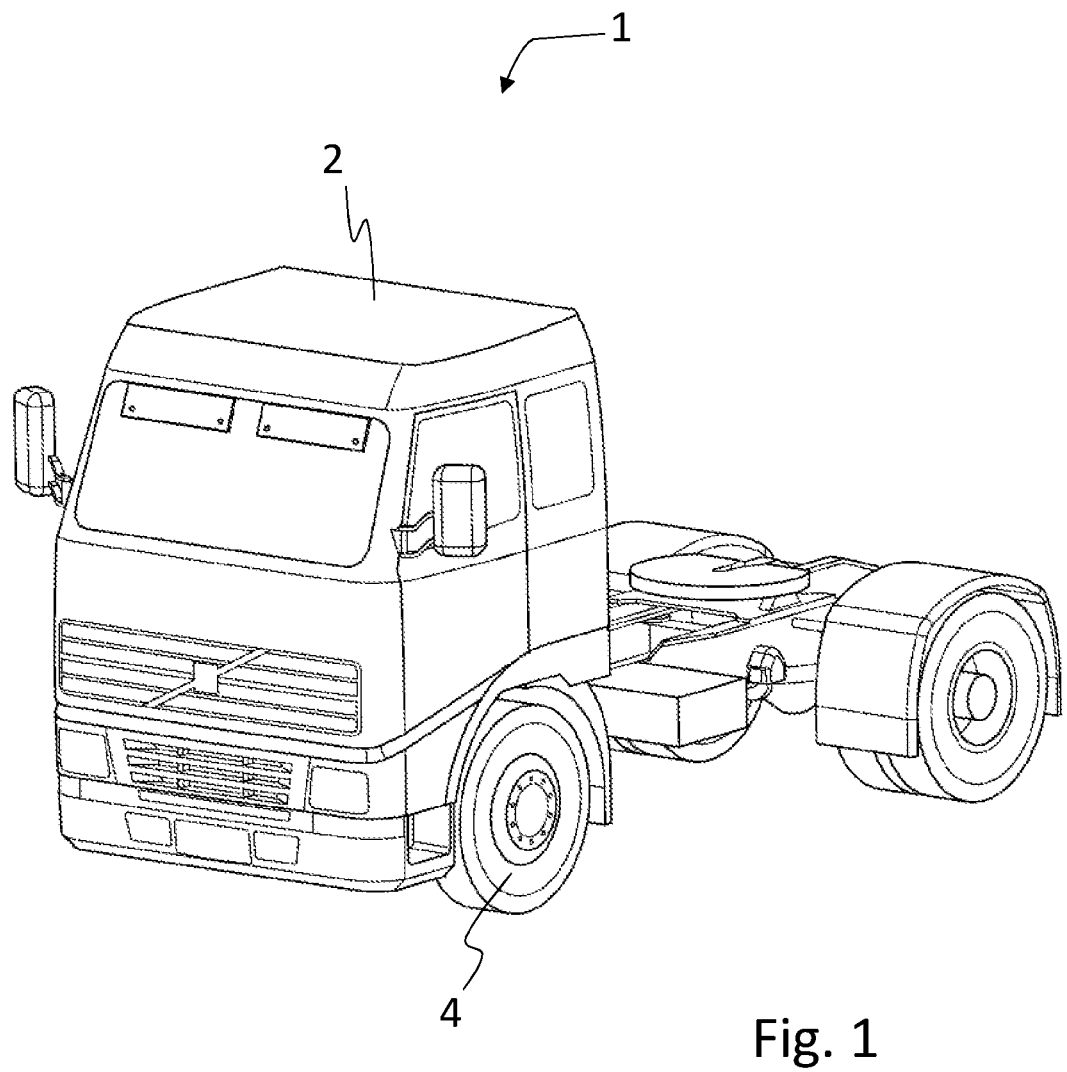
FIG. 1 illustrates a vehicle according to at least one exemplary embodiment of the invention.

The invention will now be described more fully hereinafter with reference to the accompanying drawings, in which certain aspects of the invention are shown. The invention may, however, be embodied in many different forms and should not be construed as limited to the embodiments and aspects set forth herein; rather, the embodiments are provided by way of example so that this disclosure will be thorough and complete, and will fully convey the scope of the invention to those skilled in the art. Accordingly, it is to be understood that the present invention is not limited to the embodiments described herein and illustrated in the drawings; rather, the skilled person will recognize that many changes and modifications may be made within the scope of the appended claims. Like reference numerals refer to like elements throughout the description.

FIG. 1 illustrates a vehicle 1 according to at least one exemplary embodiment of the invention. The exemplary illustration in FIG. 1 shows a tractor unit for towing a trailer unit (not shown), which together make up a semitrailer vehicle. However, the invention is applicable to other types of vehicles as well. For instance, the vehicle may be a different type of vehicle for cargo transport, such as a truck, or a truck with a dolly unit arranged to tow a trailer unit, etc.

The vehicle 1 may be driver-operated, wherein the driver operates the vehicle 1 from within a cabin 2. However, in some exemplary embodiments, the vehicle 1 may be autonomous.

The illustrated vehicle 1 is supported on wheels 4. Although the vehicle 1 in FIG. 1 only has two axles carrying wheels, the inventive concept is applicable to vehicles having more axles carrying wheels, such as in the above-mentioned different types of vehicles.

Each wheel 4, or each group of wheels, may be associated with one or more brake actuators, such as service brake actuators and/or park brake actuators. The brake actuators are controlled by a control unit, which may control the brake force applied to the wheels 4 by means of the brake actuators. The brake actuators and the control unit are not illustrated in FIG. 1, but will be discussed in more detail in connection with other figures.

Figure 2A:
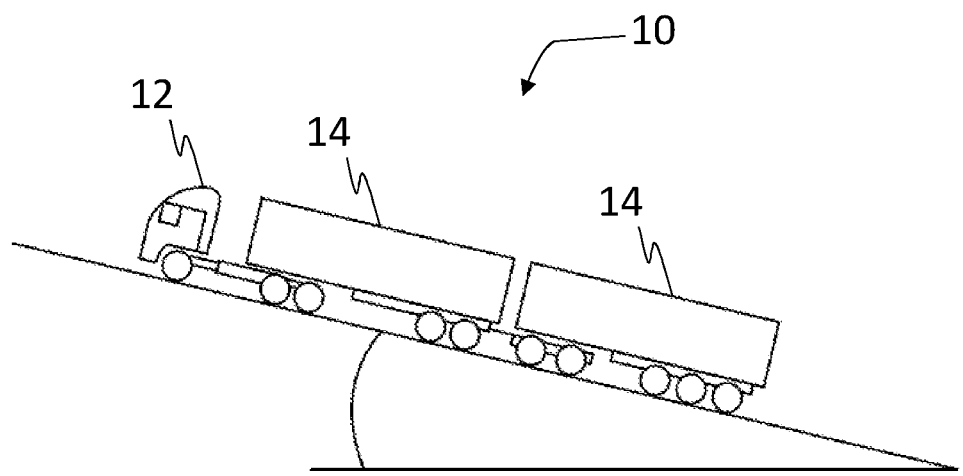
FIGS. 2a and 2b illustrate a vehicle according to another exemplary embodiment of the invention, wherein the vehicle is illustrated in two different slopes.
Figure 2B:
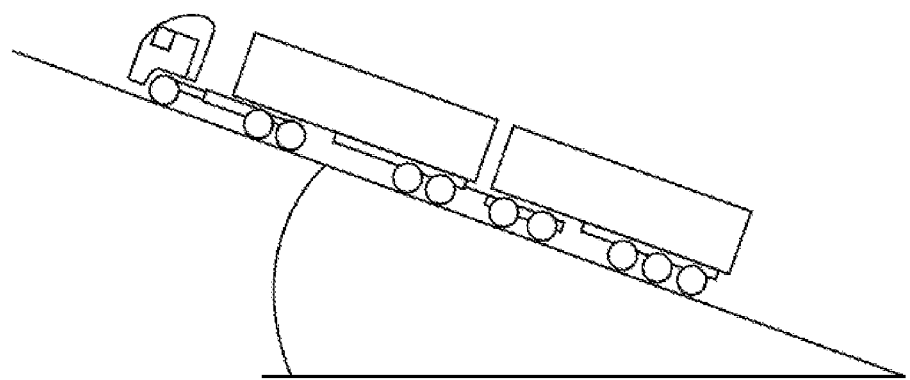

FIGS. 2a and 2b illustrate a vehicle 10 according to another exemplary embodiment of the invention, wherein the vehicle 10 is illustrated in two different slopes. The vehicle 10 is here illustrated as a truck unit 12 towing two trailer units 14. In FIG. 2a the inclination of the slope is less than in FIG. 2b. Assuming the load carried by the vehicle 10 is the same in both situations, the steeper slope in FIG. 2b will require a larger total brake force to maintain the vehicle at standstill. In most vehicles of the type illustrated in FIGS. 2a and 2b, service brakes are present in the truck unit 12 as well as in the trailer units 14. Although both the truck unit 12 and the trailer units 14 may have park brakes, in some vehicles the park brakes of the trailer units 14 may not be controllable from the truck unit 12, but a driver has to go to the outside of the respective trailer unit 14 to push a park brake button. Thus, in at least some exemplary embodiments, when the vehicle 10 comprises a truck unit 12 which tows one or more trailer units 14, the service brake force may be distributed between the truck unit 12 and the trailer unit(s) 14, and the park brake force may be applied only to the truck unit 12.

FIG. 3 is a graph illustrating very schematically an example of how brake forces may be applied in accordance with exemplary embodiments of the invention. In FIG. 3, the y-axis represents applied brake force (F), and the x-axis represents time (t). The solid line 20 represents the service brake force 20, and the dashed line 30 represents the park brake force 30. The general inventive concept is implementable to a heavy-duty vehicle which has come to a standstill in a slope due to the service brakes of the vehicle having applied a service brake force. Thus, initially, when the vehicle has come to a standstill, only the service brake force 20 has been applied. The service brake force 20 is initially constant, as shown by the horizontal part of the solid line 20. If the constant service brake force is enough to maintain the vehicle at a standstill then this force level may be determined as the total brake force ($F_{tot}$) required for maintaining the vehicle at standstill. Suitably, the total brake force may be determined with a safety margin. Immediately after the standstill has been reached, the park brake is not yet activated, thus, there is no park brake force initially. However, after a time period, the park brake is activated in order to provide the park brake force 30, and the park brake force 30 is gradually increased, as shown by the inclined dashed line 30. While the park brake force 30 is gradually increased the service brake force 20 is allowed to gradually decrease. This gradual change is done at such rate that the sum of the service brake force 20 and the park brake force 30 is maintained at a level which is at least equal to the determined total brake force. In other words the sum of the service brake force 20 and the park brake force 30 should not be below the force level represented by the horizontal part of the solid line 20. In this manner, the vehicle is securely held at a standstill, while the risk of damaging brake hardware components is reduced.

It should be noted that already before the park brake is activated, the service brake force may be appropriately distributed depending on the load carried by the different wheel axles (such as the wheel axles of the respective tractor and trailer units in FIGS. 2a and 2b). Thus, if one axle carries a relatively high load, it may be allocated a higher service brake force compared to an axle which carries a relatively low load. Similarly, when the park brake has been applied and the park brake force is gradually increased, the gradual reduction of service brake force may be different at different axles. At longer standstill time periods, it may be suitable to completely transit to a park-braked tractor unit. In such, case the reduction of the service brake force (in the trailer unit and/or the tractor unit) should be compensated by the increase of the park brake force in the tractor unit in a controlled manner It should furthermore be understood that FIG. 3 is a simplified representation for facilitating the explanation of the inventive principle. Thus, the gradual changes may be implemented differently, e.g. the gradual changes do not necessarily have to be linear, nor do they necessarily be continuous changes, the changes could for example be made in a stepwise manner. The above discussed gradual increase and gradual decrease may suitably be performed simultaneously.

FIG. 4 schematically illustrates a method 100 according to an exemplary embodiment of the invention. It is a method 100 of controlling a heavy-duty vehicle in a slope, which vehicle has come to a standstill due to service brakes of the vehicle having applied a service brake force, the method 100 comprising:

in a step S1, determining a total brake force required for maintaining the vehicle at standstill, in a step S2, activating at least one park brake for providing a park brake force, in a step S3, gradually increasing the park brake force, and in a step S4, while the park brake force is gradually increased, gradually reducing the service brake force while maintaining the sum of the service brake force and the park brake force at least equal to the determined total brake force.

The method 100 may suitably be implemented in any type of heavy-duty vehicles, such as the ones illustrated in FIG. 1 and FIGS. 2a-2b. It should be understood that said park brake force may suitably be an accumulated park brake force distributed through various park brake actuators at various locations of the vehicle. Similarly, said service brake force may suitably be an accumulated service brake force distributed through various service brake actuators at various locations of the vehicle.

The total brake force may suitably be calculated and determined (step S1) based on one or more of the following parameters: the slope of the road surface, the load carried by the vehicle, and the friction between the tyres of the vehicle and the road surface. For instance, in the situation in FIG. 2b the slope is greater than in the situation in FIG. 2a. Accordingly, it would be determined that the required total brake force would be higher in the situation in FIG. 2b compared to in the situation in FIG. 2a. Similarly, if the load carried by the vehicle is higher in one case than in another, then the higher load case would result in a determination of a higher required total brake force. Likewise, if the friction between the tyres and road surface is lower in one case than in another, then the lower friction case would result in a determination of a higher required total brake force. The determination of the required total brake force may be performed by a control unit. Likewise, the gradual change of the service brake force and the gradual change of the park brake force may also be controlled by such a control unit. Such a control unit will be discussed later in this disclosure.

The step S2, i.e. activating the at least one park brake may suitably be performed after a configurable time period. The time period may, for instance, depend on the above mentioned parameters.

FIG. 5 schematically illustrates a method 200 according to other exemplary embodiments of the invention. The method 200 in FIG. 5 comprises all the steps S1-S4 of the method 100 in FIG. 4. Additionally, it may comprise one or more optional steps, here collectively referred to as step S5. For instance, the step S5 may comprise setting a safety margin such that said sum of the service brake force and the park brake force is maintained at least equal to the determined total brake force plus the safety margin. In some exemplary embodiments, step S5 may comprise allocating, between wheel axles of a truck unit and wheel axles of one or more trailer units, a force distribution of said total brake force in dependence on the load carried by the respective wheel axles. In some exemplary embodiments, step S5 may comprise allocating a force distribution between the service brake force and the park brake force based on a defined service brake force function. In some exemplary embodiments, step S5 may comprise releasing the service brake and the park brake upon receipt of a propulsion request. In some exemplary embodiments, step S5 may comprise taking available vehicle motion sensor data into account to detect movement of the vehicle, and when movement is detected, gradually increasing the service brake force to regain standstill. The determined total brake force may be set to be, or reset to be, at least equal to the service brake force that has been applied to regain standstill in response to the detection of movement.

Figure 6:
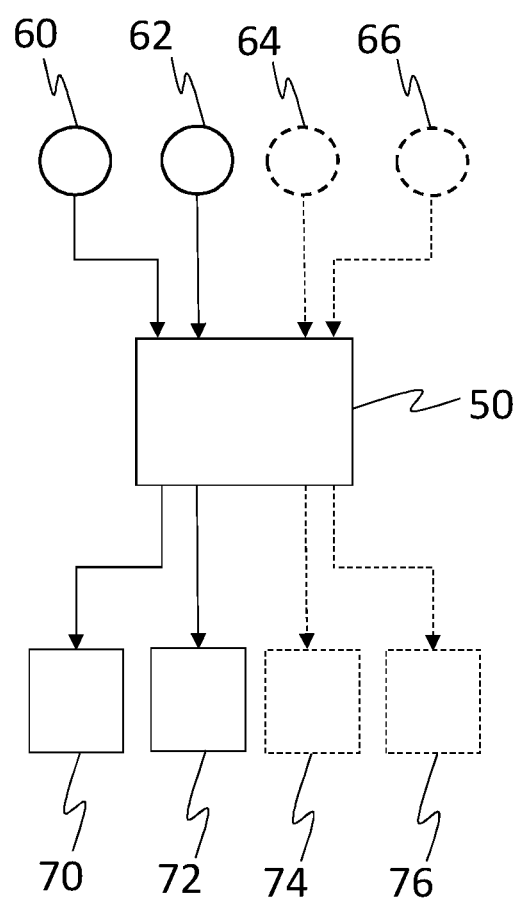
FIG. 6 schematically illustrates input into and output from a control unit which may be implemented in a vehicle in accordance with exemplary embodiments of the invention.

It should be noted that, suitably, all steps S1-S5 may be performed autonomously as part of an adaptive cruise control mode of the vehicle. However, in some exemplary embodiments of the invention the steps S1-S5 may be performed in response to a driver-initiated auto-hold command FIG. 6 schematically illustrates input into and output from a control unit 50 which may be implemented in a vehicle (such as the vehicles 1, 10 illustrated in FIGS. 1, 2a-2b), in accordance with exemplary embodiments of the invention. Suitably, the vehicle is provided with a first sensor 60 for measuring the slope of the road surface, and a second sensor 62 for measuring the load carried by the vehicle. As illustrated with dashed lines, the vehicle may have additional sensors 64, 66, such as additional sensors for measuring the slope or load, for example provided at different parts, axles, units, etc. of the vehicle. However, the additional sensors 64, 66 may include sensors for measuring other parameters. For instance, they may be wheel speed sensors, or cameras, etc. for detecting movement of the vehicle. Although only two additional sensors 64, 66 have been schematically illustrated in FIG. 6 for exemplifying purpose, it should of course be understood that there may be many more.

The sensors 60-64 provide sensor input data to the control unit 50. The control unit 50 may based on the sensor input data (i.e. the received measurement data) calculate and determine a required total brake force for maintaining the vehicle at standstill in the slope where the vehicle has currently stopped with applied service brake force. The control unit (50) may then send output, in the form of control signals, to various brake actuators, including at least a service brake actuator 70 and a park brake actuator 72. As illustrated in FIG. 6 there may be additional brake actuators 74, 76 (only two shown but there may, of course, be more), for example distributed in different parts, units axles, wheels, etc. of the vehicle. The control unit 50 will thus control a park brake actuator 72 to activate a park brake for providing a park brake force, and to gradually increase the park brake force. While the park brake force is increased, the control unit 50 will also control a service brake actuator 70 to gradually reduce the service brake force at such rate that the sum of the service brake force and the park brake force is maintained at least equal to the determined total brake force.

Figure 7:
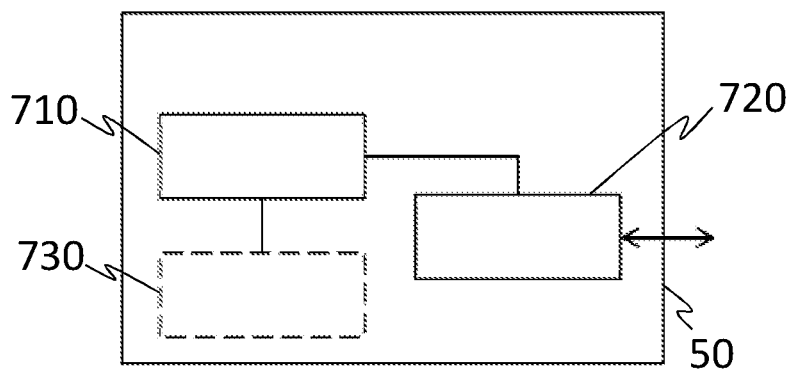
FIG. 7 schematically illustrates a control unit according to at least one exemplary embodiment of the invention.

FIG. 7 schematically illustrates the above mentioned control unit 50 according to at least one exemplary embodiment of the invention. In particular, FIG. 7 illustrates, in terms of a number of functional units, the components of a control unit 50 according to exemplary embodiments of the discussions herein. The control unit 50 may be comprised in a vehicle, such as illustrated schematically in FIGS. 1 and 2a-2b. Processing circuitry 710 may be provided using any combination of one or more of a suitable central processing unit CPU, multiprocessor, microcontroller, digital signal processor DSP, etc., capable of executing software instructions stored in a computer program product, e.g. in the form of a storage medium 730. The processing circuitry 710 may further be provided as at least one application specific integrated circuit ASIC, or field programmable gate array FPGA.

Particularly, the processing circuitry 710 is configured to cause the control unit 50 to perform a set of operations, or steps, such as the methods discussed in connection to FIGS. 4 and 5. For example, the storage medium 730 may store the set of operations, and the processing circuitry 710 may be configured to retrieve the set of operations from the storage medium 730 to cause the control unit 50 to perform the set of operations. The set of operations may be provided as a set of executable instructions. Thus, the processing circuitry 710 is thereby arranged to execute exemplary methods as herein disclosed.

The storage medium 730 may also comprise persistent storage, which, for example may be any single one or combination of magnetic memory, optical memory, solid state memory or even remotely mounted memory.

The control unit 50 may further comprise an interface 720 for communications with at least one external device such as the brake actuators 70-76, the sensors 60-66, etc. As such, the interface 720 may comprise one or more transmitters and receivers, comprising analogue and digital components and a suitable number of ports for wireline or wireless communication.

The processing circuitry 710 controls the general operation of the control unit 50, e.g. by sending data and control signals to the interface 720 and the storage medium 730, by receiving data and reports from the interface 720, and by retrieving data and instructions form the storage medium 730. Other components, as well as the related functionality, of the control unit 50 are omitted in order not to obscure the concepts presented herein.

Thus, with reference also to the previously discussed figures, FIG. 7 shows an exemplary control unit 50 for controlling a heavy-duty vehicle in a slope, the control unit 50 being configured to perform the steps of the methods of FIGS. 4 and 5, including any embodiments thereof.

Figure 8:
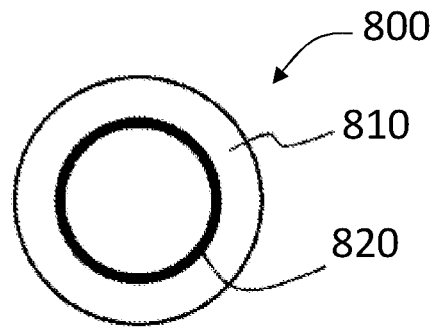
FIG. 8 schematically illustrates a computer program product according to at least one exemplary embodiment of the invention.

FIG. 8 schematically illustrates a computer program product 800 according to at least one exemplary embodiment of the invention. More specifically, FIG. 8 illustrates a computer readable medium 810 carrying a computer program comprising program code means 820 for performing the methods exemplified in FIGS. 4 and 5, when said program product is run on a computer. The computer readable medium 810 and the program code means 820 may together form the computer program product 800.

The invention claimed is:

1. A method of controlling a heavy-duty vehicle in a slope when the vehicle has come to a standstill due to service brakes of the vehicle having applied a service brake force, the method comprising:
   determining a total brake force required for maintaining the vehicle at standstill;
   activating at least one park brake for providing a park brake force;
   gradually increasing the park brake force; and
   while the park brake force is gradually increased, gradually reducing the service brake force while maintaining the sum of the service brake force and the park brake force at least equal to the determined total brake force;

wherein:
the step of activating the at least one park brake is performed after a configurable time period;
the configurable time period is dependent on one or more of the following parameters:
a slope of the road surface; and/or
a load carried by the vehicle; and
the method further comprising configuring a length of the configurable time period to be inversely related to a weight of a load and/or inversely related to a steepness of a slope.

2. The method of claim 1, wherein the total brake force is calculated and determined based on one or more of the following parameters:
a slope of a road surface;
a load carried by the vehicle; and/or
friction between tires of the vehicle and the road surface.

3. The method of claim 1, further comprising:
setting a safety margin so that the sum of the service brake force and the park brake force is maintained at least equal to the determined total brake force plus the safety margin.

4. The method of claim 1, wherein the vehicle comprises a truck unit which tows a trailer unit, the method further comprising:
allocating, between wheel axles of the truck unit and wheel axles of the trailer unit, a force distribution of the total brake force in dependence on the load carried by the respective wheel axles.

5. The method of claim 1, further comprising:
allocating a force distribution between the service brake force and the park brake force based on a defined service brake force function.

6. The method of claim 1, further comprising:
releasing the service brake and the park brake upon receipt of a propulsion request.

7. The method of claim 1, further comprising:
taking available vehicle motion sensor data into account to detect movement of the vehicle; and
when movement is detected, gradually increasing the service brake force to return the vehicle to standstill.

8. The method of claim 7, wherein the determined total brake force is set to be, or reset to be, at least equal to the service brake force that has been applied to return the vehicle to standstill in response to the detection of movement.

9. The method of claim 1, wherein the steps are performed autonomously as part of an adaptive cruise control mode of the vehicle.

10. The method of claim 1, wherein the steps are performed in response to a driver-initiated auto-hold command.

11. The method of claim 1, wherein the vehicle comprises a truck unit which tows a trailer unit, wherein the service brake force is distributed between the truck unit and the trailer unit, and wherein the park brake force is applied only to the truck unit.

12. A non-transitory computer readable medium carrying a computer program comprising program code means for performing the steps of claim 1 when the program code is run on a computer.

13. A control unit circuit for controlling a heavy-duty vehicle in a slope, the control unit circuit being configured to perform the steps of the method according to claim 1.

14. A vehicle, comprising:
the control unit circuit of claim 13;
at least a first sensor for measuring a slope of the road surface; and
at least a second sensor for measuring a load carried by the vehicle;
wherein the control unit circuit is configured to receive measurement data from the first and second sensors.

* * * * *